US008714500B2

(12) United States Patent
Ng et al.

(10) Patent No.: US 8,714,500 B2
(45) Date of Patent: May 6, 2014

(54) LOCKING SAFETY BRACKET AND CLUTCH FOR BLINDS

(76) Inventors: Philip Ng, Thornhill (CA); Norman Wills, Mississauga (CA)

( * ) Notice: Subject to any disclaimer, the term of this patent is extended or adjusted under 35 U.S.C. 154(b) by 42 days.

(21) Appl. No.: 13/074,055

(22) Filed: Mar. 29, 2011

(65) Prior Publication Data

US 2011/0233356 A1 Sep. 29, 2011

Related U.S. Application Data

(60) Provisional application No. 61/318,575, filed on Mar. 29, 2010.

(51) Int. Cl.

| | |
|---|---|
| ***A47B 96/00*** | (2006.01) |
| ***A47K 1/00*** | (2006.01) |
| ***A47K 5/00*** | (2006.01) |
| ***E04G 5/06*** | (2006.01) |
| ***F16L 3/08*** | (2006.01) |
| ***F21V 21/00*** | (2006.01) |
| ***F21V 35/00*** | (2006.01) |
| *A47H 1/10* | (2006.01) |
| *A47H 1/13* | (2006.01) |
| *E06B 9/17* | (2006.01) |
| *F16D 1/00* | (2006.01) |

(52) U.S. Cl.
USPC ...... 248/222.11; 248/266; 248/267; 248/304; 248/225.11; 248/225.21; 403/353

(58) Field of Classification Search
USPC .......... 248/220.21, 220.22, 220.31, 251, 261, 248/262, 264–267; 403/353
See application file for complete search history.

(56) References Cited

U.S. PATENT DOCUMENTS

| | | | | |
|---|---|---|---|---|
| 2,390,826 | A * | 12/1945 | Cohn | 160/170 |
| 3,392,848 | A * | 7/1968 | Kennedy et al. | 211/192 |
| 5,857,653 | A * | 1/1999 | Dujlovich | 248/267 |
| 6,196,508 | B1 * | 3/2001 | Nijs | 248/267 |
| 6,443,320 | B1 * | 9/2002 | Herzog et al. | 211/192 |
| 2008/0302489 | A1 * | 12/2008 | Wong | 160/178.2 |

FOREIGN PATENT DOCUMENTS

| | | | |
|---|---|---|---|
| EP | 1936106 A2 * | 6/2008 | E06B 9/50 |

* cited by examiner

*Primary Examiner* — Jonathan Liu
*Assistant Examiner* — Taylor Morris
(74) *Attorney, Agent, or Firm* — Elias Borges

(57) ABSTRACT

There is disclosed an improved support bracket for mounting a clutch of a roller blind. The clutch of roller blind used with this improved bracket is the type having at least one projecting pin. The support bracket includes a bracket housing having a flat wall with at least one aperture configured to receive the projecting pin such that the pin passes through the aperture and extends past the flat wall. The aperture is configured to permit the pin to slide up and down inside the aperture between a first and second position when the pin is positioned in the aperture. The bracket also includes a spring lock member mounted to the flat wall adjacent the aperture, the spring lock positioned to partially obstruct the aperture. The spring lock member is configured such that when the pin is inserted into the aperture the spring lock is deflected out of the way to permit the pin to be inserted into the aperture. The spring lock is further configured to rebound back when the pin is moved towards its second position, the rebounded spring lock member preventing the pin from moving back towards its first position.

6 Claims, 5 Drawing Sheets

LOCKING SAFETY BRACKET AND CLUTCH FOR BLINDS

CROSS REFERENCE TO RELATED APPLICATION

This application claims priority from U.S. provisional patent application No. 61/318,575 dated Mar. 29, 2010, the entirety of which is incorporated herein by reference.

FIELD OF THE INVENTION

The invention relates generally to roller clutches for blinds and brackets for mounting same to a wall or window frame.

BACKGROUND OF THE INVENTION

Blinds and window coverings, particularly roller blinds, generally consist of a roller tube upon which a blind is wound combined with a clutch and idle end on either end of the roller tube, which are in turn supported by a bracket. The bracket is mounted to the wall, window frame or ceiling, depending on the installation. The connection between the bracket and the clutch is critical in supporting the roller blind. Generally, the clutch will have a finger which projects outward and which engages a corresponding aperture in the bracket. The clutch is therefore held on to the bracket by this simple connection which is often prone to failure. This is particularly a concern given the fact that the operator is applying pressure on the clutch mechanism by raising and lowering the blind, causing the clutch to vibrate as the clutch is operated. If the connection between the bracket and clutch is not secure, there is the possibility that the clutch may come off the bracket, causing the entire blind to fall. Alternatively, if the clutch is loose on the support bracket, operating the clutch to raise or lower the blind will cause a rattling noise as the clutch vibrates against the support bracket. An improved bracket for securely mounting the clutch to the bracket is therefore required.

SUMMARY OF THE INVENTION

In accordance with one aspect of the present invention, there is provided an improved support bracket for mounting a clutch of a roller blind. The clutch of roller blind used with this improved bracket is the type having at least one projecting pin. The support bracket includes a bracket housing having a flat wall with at least one aperture configured to receive the projecting pin such that the pin passes through the aperture and extends past the flat wall. The aperture is configured to permit the pin to slide up and down inside the aperture between a first and second position when the pin is positioned in the aperture. The bracket also includes a spring lock member mounted to the flat wall adjacent the aperture, the spring lock positioned to partially obstruct the aperture. The spring lock member is configured such that when the pin is inserted into the aperture the spring lock is deflected out of the way to permit the pin to be inserted into the aperture. The spring lock is further configured to rebound back when the pin is moved towards its second position, the rebounded spring lock member preventing the pin from moving back towards its first position.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
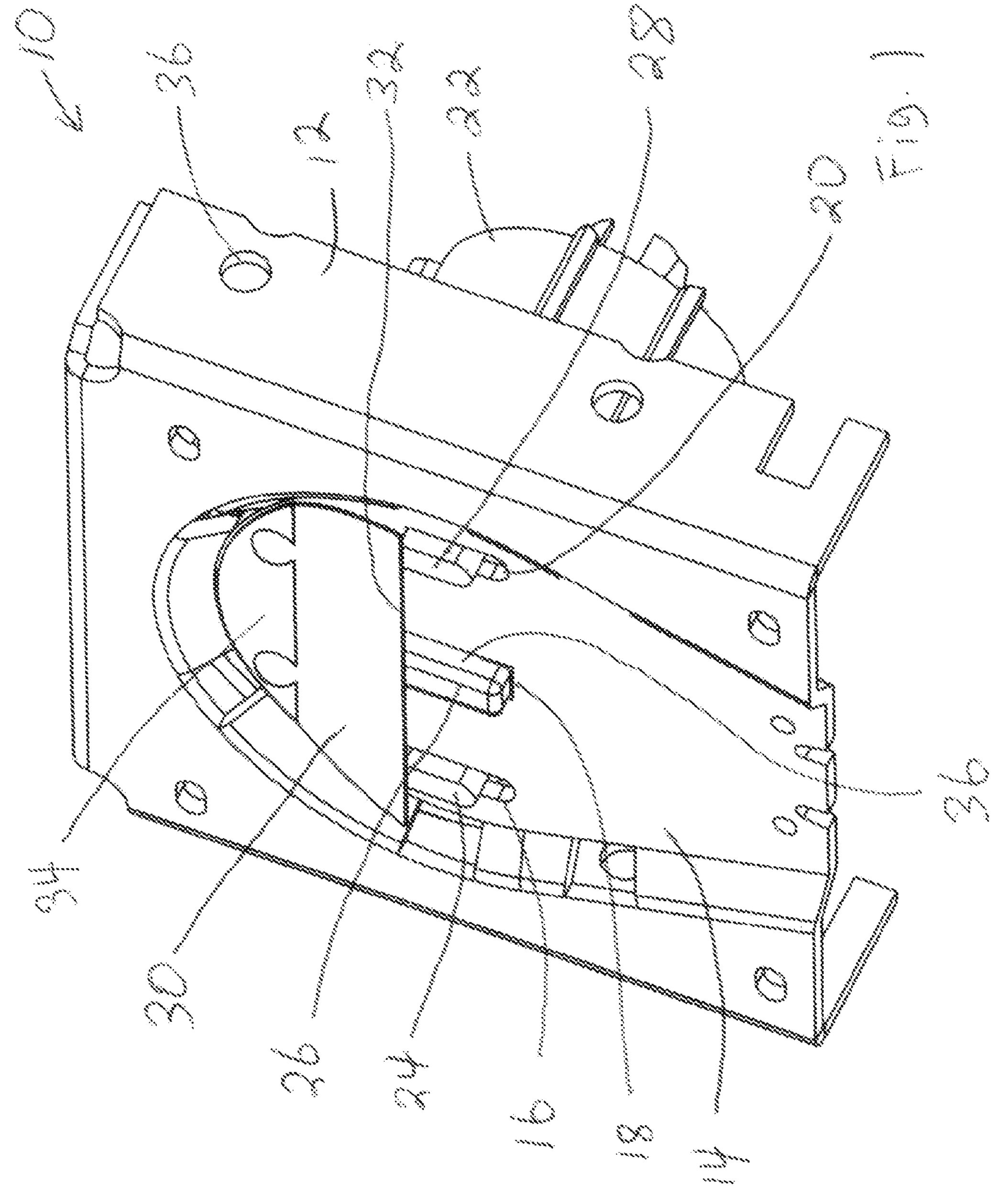
FIG. 1 is a perspective view of a support bracket made in accordance with the present invention showing a roller clutch being inserted into the bracket with the projecting pins of the clutch being in their first position and showing the spring lock member being deflected.
Figure 3:
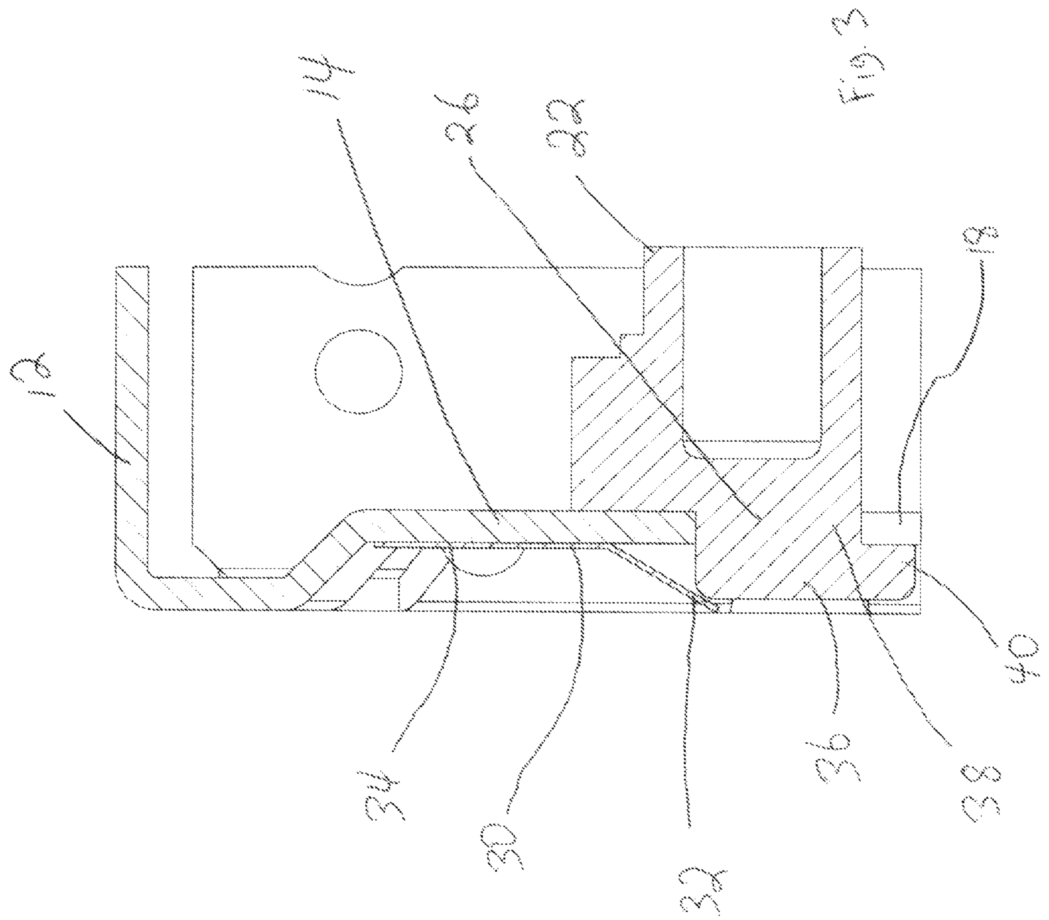
FIG. 3 is a sectional view of the support bracket shown in FIG. 1 with the pins of the clutch being in their first position.

Referring to FIG. 1, a support bracket made in accordance with the present invention, shown generally as item 10, includes a bracket housing 12 having a flat wall 14 with apertures 16, 18 and 20 formed thereon. Apertures 36 are formed on housing 12 to permit the bracket to be mounted to a wall, window frame or ceiling using screws or bolts. Apertures 16, 18 and 20 are dimensioned to receive projecting pins 24, 26 and 28 of roller clutch 22. Apertures 16, 18 and 20 are sufficiently elongated to permit fingers 24, 26 and 28 to move back and forth along the apertures. Spring lock member 30 is mounted to wall 14 adjacent apertures 16, 18 and 20. Spring lock member 30 has a bottom edge 32 which projects towards apertures 16, 18 and 20 partially obstructing the apertures when the spring lock member is in its rest (or locked) position. Edge 32 sufficiently obstructs apertures 16, 18 and 20 that as pins 24, 26 and 28 are inserted into their respective apertures, the pins contact edge 32 and deflect member 30 sufficiently that the pins can be fully inserted. Spring lock member 30 has an upper portion 34 which is rigidly mounted to wall 14 while lower edge 32 is free to flex out of the way as pins 16, 18 and 20 are inserted. As best seen in FIG. 3, pin 26 is hook shaped and has a head portion 36 which is larger and a neck portion 38 which narrower than head portion 36. Head portion 36 forms a hook like structure 40. Neck portions 38 is dimensioned so that when pin 26 is fully inserted into aperture 18, head portion 36 extends just past aperture 18 to permit the neck portion to move back and forth within aperture 18.

Returning again to FIG. 1, since pin 26 has a head portion which is larger than pins 24 and 28, and is only slightly smaller than aperture 18, inserting pin 26 into aperture 18 automatically places all three pins in their first position relative to the apertures. In this first position, all three pins contact bottom edge 32 of spring lock member 30. Spring lock member 30 is made of a highly resilient steel, and is therefore capable of deflecting as pins 24, 26 and 28 are inserted into apertures 16, 18 and 20, respectively.

Figure 2:
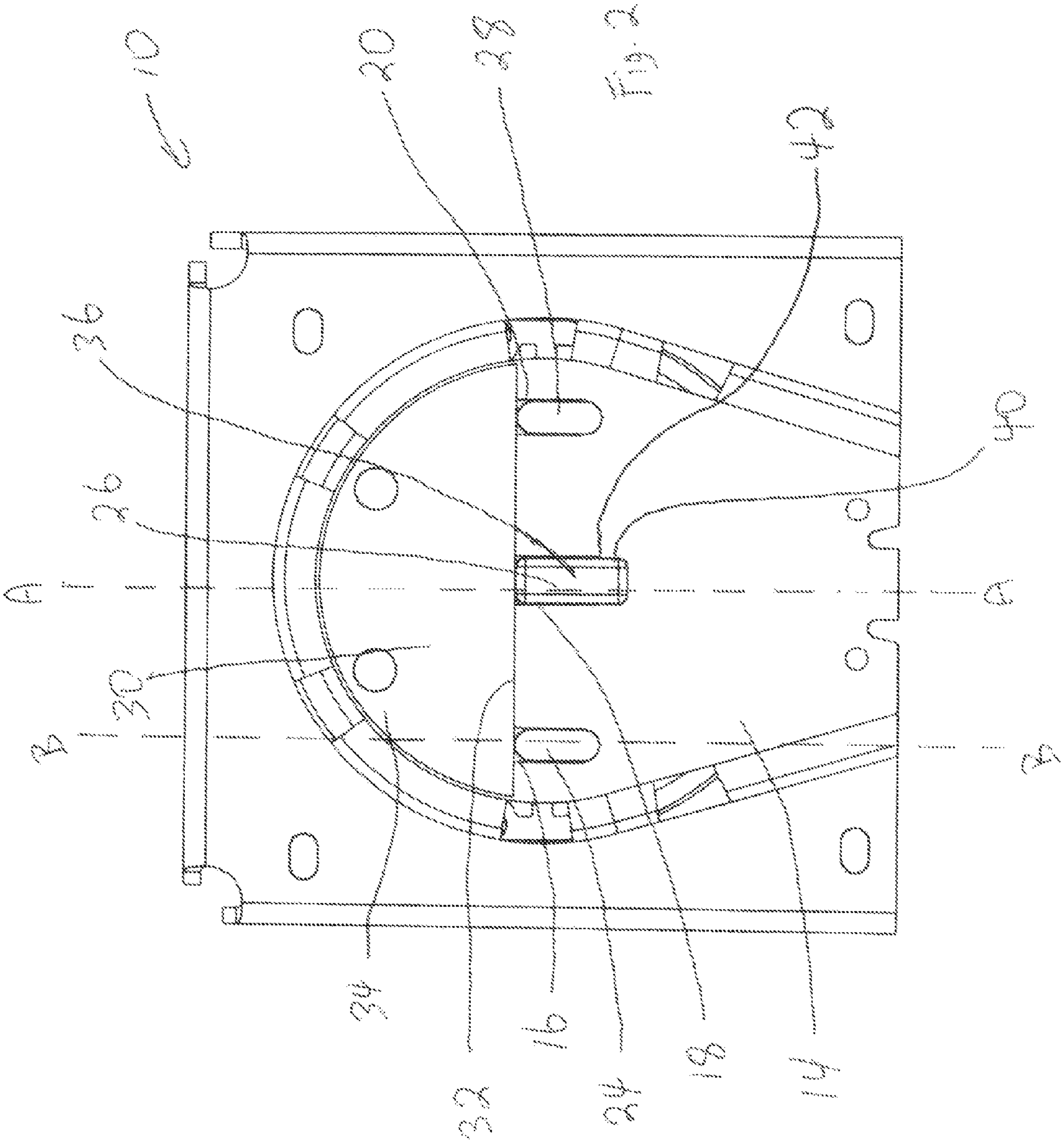
FIG. 2 is a side view of the support bracket shown in FIG. 1 with the pins of the clutch being in their second position.

Referring now to FIG. 2, after being fully inserted into their respective apertures 16, 18 and 20, pins 24, 26 and 28 are moved downwards away from spring lock member 30 and towards their second position as shown. Since hook portion 40 of pin 26 projects past aperture 18, it is possible to move the pins downward. When pins 24, 26 and 28 reach their second position, spring lock member 30 springs back towards wall 14. With bottom edge 32 of the spring lock positioned against wall 14, pins 24, 26 and 28 cannot move back towards their first position. The pins are thereby locked in their second position. Since hook portion 40 of pin 26 extends beyond lower edge 42 of aperture 18, the pin cannot be pulled out of the aperture. The pins are effectively locked in place and the clutch is effectively locked to bracket 10.

Figure 4:
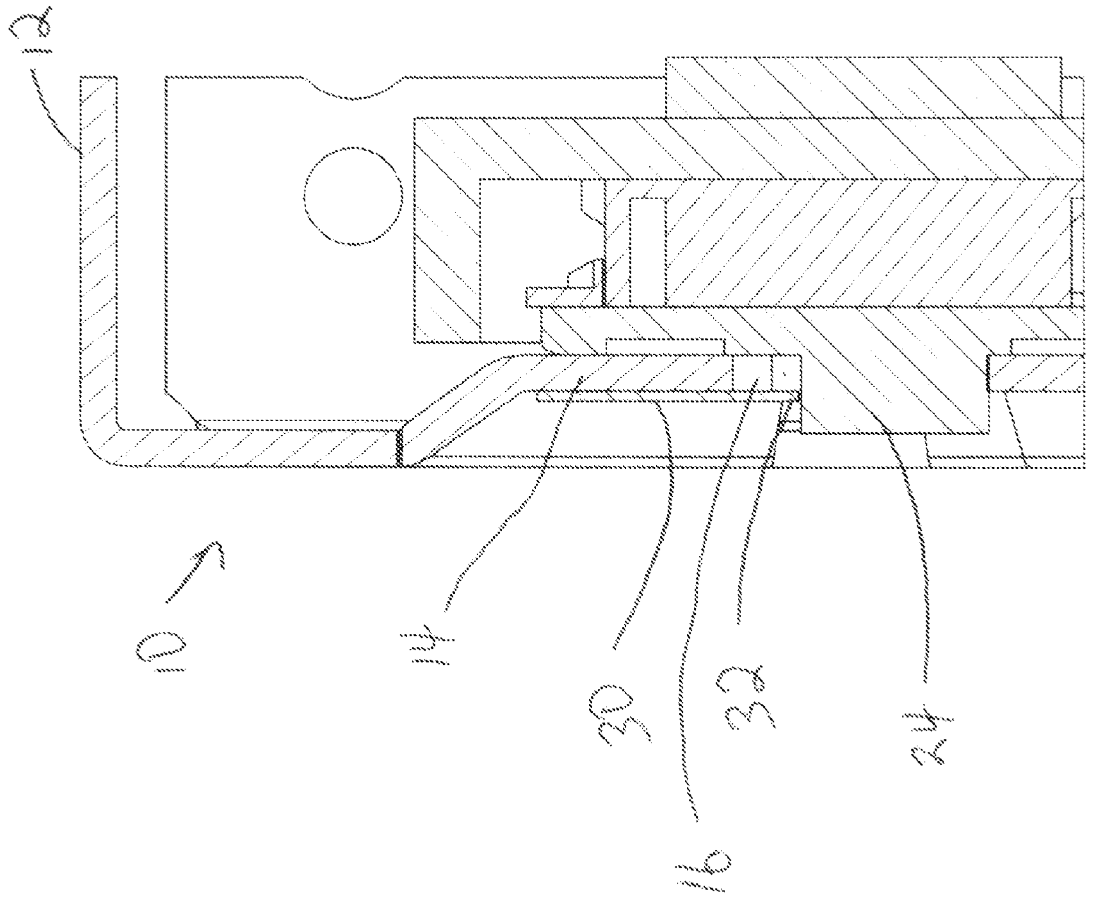
FIG. 4 is a sectional view of the support bracket shown in FIG. 1 with the pins of the clutch being in their second position.

FIG. 4 shows pin 24 in its second position relative to aperture 16. Again, in this second position, bottom edge 32 of spring lock member 30 is flush against wall 14 and effectively blocks the pin from moving upwards. The spring lock mechanism effectively acts as an automatically locking means to keep the clutch locked in position.

Figure 5:
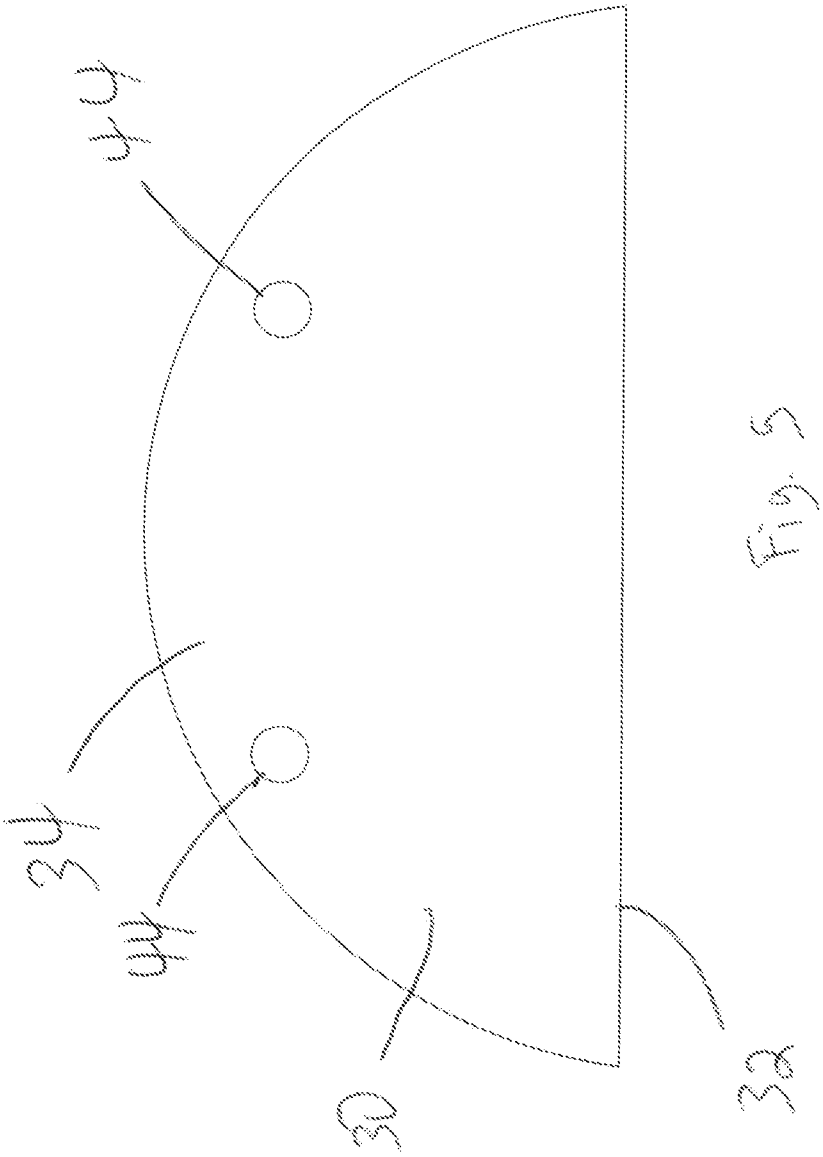
FIG. 5 is a front view of the spring lock member portion of the support bracket shown in FIG. 1.

Referring now to FIG. 5, spring lock member 30 preferably comprises a thin sheet of highly springy steel. Bottom edge 32 is preferably beveled to remove any sharp edges which may interfere with the smooth operation of the spring lock. Apertures 44 may be punched into upper portion 34 of the spring member to make it easy to mount the spring member to the support bracket.

The present invention has many advantages over the prior art. With the clutch locked into place on the support bracket, the clutch will not move when the blind is raised or lowered. As a result, the clutch will not rattle against the support bracket as the blind is raised and lowered, making the blind quieter to operate. Also, since the clutch is automatically locked into place by merely moving the locking member into its locked position, the clutch cannot be accidentally dislodged and fall off the bracket. This makes the blind safer to operate because it will not fall off the wall or window as the blind is being operated.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims Therefore, what is claimed is:

1. A support bracket for mounting a clutch of a roller blind comprising:

a) a clutch having at least one pin projecting therefrom, the pin having a hook;

b) a bracket housing having a flat wall with an aperture configured to receive the pin such that the pin passes through the aperture and extends past the flat wall, the aperture being configured to permit the pin to slide up and down inside the aperture between a first and second position when the pin is positioned in the aperture;

c) a spring lock member mounted to the flat wall adjacent the aperture, the spring lock positioned such that a portion of the spring lock overlays and partially obstructs the aperture, the spring lock member dimensioned and configured such that a portion of the aperture is not overlaid by the spring lock;

d) the spring lock member being configured such that when the pin is inserted into the aperture in a first direction the portion of the spring lock which overlays the aperture is deflected by the pin in the first direction out of the way to permit the hook to extend beyond the aperture, the spring lock being further configured to rebound back when the pin is moved to the pin's second position, the rebounded spring lock member preventing the pin from moving back to the pin's first position.

2. The support bracket of claim 1 wherein the hook of the pin hooks onto a lip of the aperture when the pin is in the pin's second position.

3. A support bracket for mounting a clutch of a roller blind comprising:

a) at least one pin projecting from a clutch, the pin having a hook formed thereon;

b) a bracket housing having a flat wall with an aperture configured to receive the pin such that the pin passes through the aperture and extends past the flat wall, the aperture being configured to permit the pin to slide up and down inside the aperture between a first and second position when the pin is positioned in the aperture;

c) a lock member movably mounted to the flat wall adjacent the aperture such that a portion of the lock member overlays only a portion of the aperture leaving another portion of the aperture unobstructed, the lock member movable between an unlocked positioned wherein the lock member is clear of the aperture and the pin can be inserted into the aperture and move between its first and second position, and a locked position wherein the lock member partially obstructs and partially overlays the aperture and prevents the pin from moving from the pin's second position to the pin's first position;

d) the aperture configured such that the hook engages an edge of the aperture when the pin is in the pin's second position, thereby preventing the pin from being removed from the aperture.

4. The support bracket of claim 3 wherein the lock member is made of a resilient material and mounted to the bracket such that the lock member is biased towards the lock member's locked position, the lock member being mounted to the bracket such that inserting the pin into the aperture causes the lock member to deflect out of the way of the pin and to the lock member's unlocked position, the lock member rebounding back towards the lock member's locked position when the pin moves to the pin's second position.

5. A support bracket for mounting a clutch of a roller blind comprising:

a) at least one pin projecting from a clutch, a hook being formed on a side of the pin;

b) a bracket housing having a wall with opposite first and second sides and an aperture configured to receive the pin such that the pin passes through the aperture from the first side of the wall and extends past the second side of the wall, the aperture being configured to permit the pin to slide up and down inside the aperture between a first and second position when the pin is positioned in the aperture;

c) a spring having opposite first and second ends, the spring being mounted to the second side of the wall by the first end of the spring, the spring being dimensioned and configured such that the second end of the spring is biased towards a locked position wherein the second end of the spring partially overlays and obstructs the aperture, the spring configured to be deflected away from the spring's locked position by the pin when the pin is forced into the aperture from the first side of the wall;

d) the hook engages an edge of the aperture when the pin is moved to the pin's second position, the spring being further configured to rebound to the spring's locked position when the pin moves to the pin's second position and prevent the pin from moving back to the pin's first position.

6. The support bracket of claim 5 wherein the spring is positioned on the wall such that the second end of the spring is positioned opposite the hook when the hook is inserted into the aperture.

* * * * *